United States Patent
Shin

(10) Patent No.: US 6,549,524 B1
(45) Date of Patent: Apr. 15, 2003

(54) INTER-FREQUENCY HANDOFF METHOD

(75) Inventor: Yeong Jong Shin, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/468,604

(22) Filed: Dec. 21, 1999

(30) Foreign Application Priority Data

Dec. 22, 1998 (KR) .......................................... 98/57394

(51) Int. Cl.[7] .................................................. H04Q 7/20
(52) U.S. Cl. ...................... 370/331; 370/330; 455/442; 455/436; 455/437; 455/438; 455/443
(58) Field of Search ................................. 370/331, 330, 370/344, 319; 455/442, 436, 437, 438, 443

(56) References Cited

U.S. PATENT DOCUMENTS

| | | | | |
|---|---|---|---|---|
| 5,513,246 A | * | 4/1996 | Jonsson et al. | ................ 379/60 |
| 5,812,540 A | * | 9/1998 | Bruckert et al. | ............ 370/332 |
| 6,075,990 A | * | 6/2000 | Shin | ............................ 455/440 |
| 6,154,653 A | * | 11/2000 | Jung | ............................ 455/442 |
| 6,208,631 B1 | * | 3/2001 | Kim | ............................ 370/332 |
| 6,181,943 B1 | * | 6/2001 | Kuo et al. | ................... 455/437 |
| 6,430,200 B1 | * | 8/2002 | Han et al. | ................... 370/500 |

* cited by examiner

*Primary Examiner*—William Trost
*Assistant Examiner*—Eugene Yun
(74) *Attorney, Agent, or Firm*—Fleshner & Kim, LLP

(57) ABSTRACT

An efficient and low cost method for performing inter-frequency handoff in a mobile communication system is implemented in software. As a result, none of the additional hardware required by conventional handoff systems to perform a handoff operation is needed. The inter-frequency handoff method includes as an initial step extracting handoff career data. Then, a threshold value determined from the extracted handoff career data is compared with a signal strength value from a mobile station, which is engaged in a call in a first cell using a non-common frequency with a second cell where handoff is to be performed. A point in time for performing the handoff is then decided based on the comparison. Finally, handoff is executed based on the non-common frequency at the decided point in time.

17 Claims, 4 Drawing Sheets

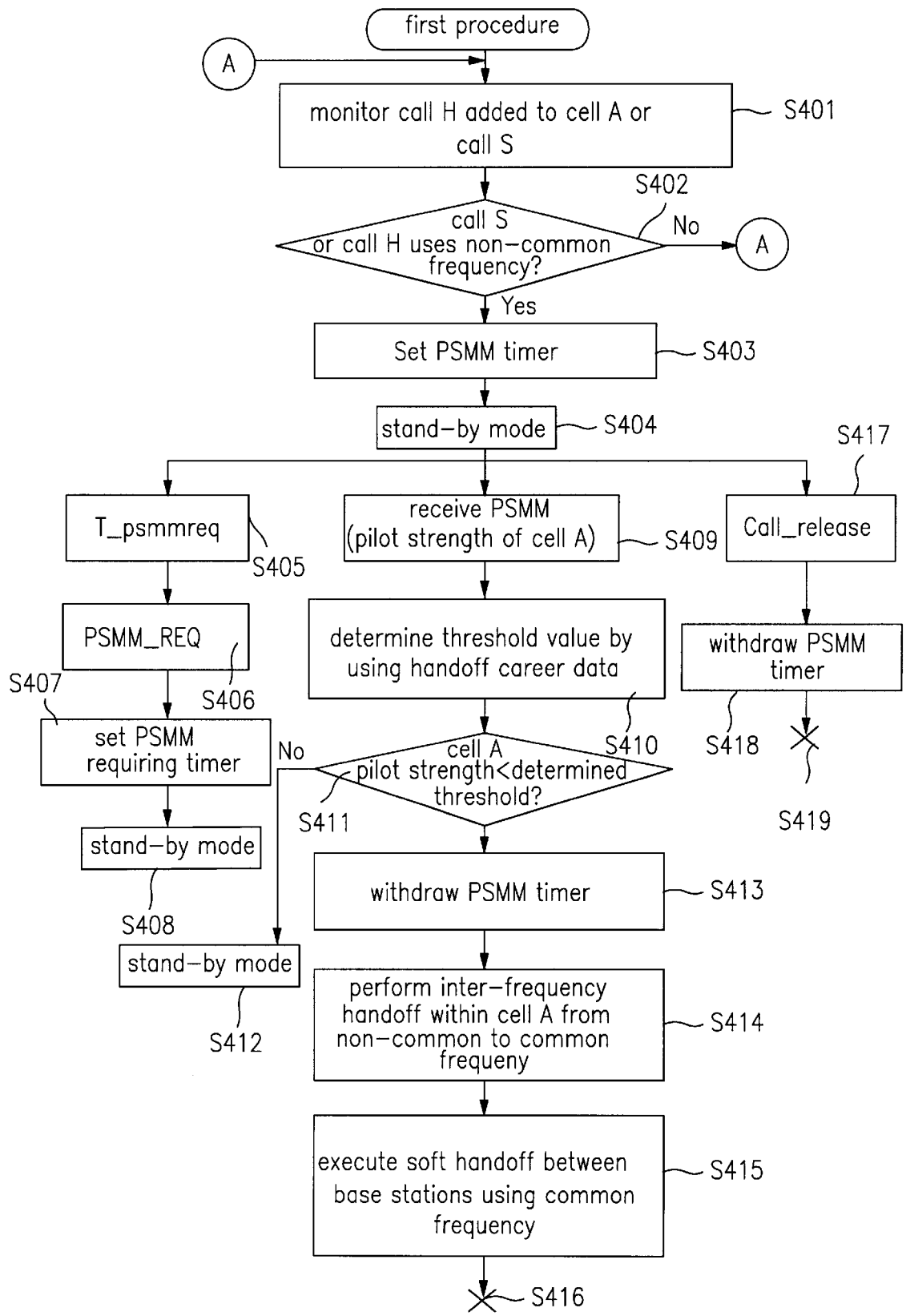

INTER-FREQUENCY HANDOFF METHOD

BACKGROUND OF THE INVENTION

1. Field of the Invention

The present invention relates to a mobile communication system, and more particularly to an intra-frequency handoff method in a mobile communication system based on a code division multiple access (hereinafter, referred to as "CDMA")

2. Discussion of Related Art

Generally, in a CDMA mobile communication system, all base stations share the available frequency (FA) and each base station has sectors or areas in which service is provided to mobile stations. The probability of call drops for a mobile station which moves between base stations having different FA is relatively high. Thus, the CDMA mobile communication allows a number of respective base stations to have common number of FA within overlapping zones of operation.

When a mobile station moves from one base station to another, a handoff allows a continual communication by switching radio lines to connect speech paths between the base stations. A handoff may largely be classified into two kinds as follows.

A soft handoff occurs when a mobile station moves from one base station to another base station wherein the base stations have a common FA. In the soft handoff, a communication with a new base station begins before communication with a base station currently in service ends, thereby maintaining the traffic path. The system may allow a use of two traffic paths by utilizing a rake reception function of the CDMA. In such case, a handoff between sectors of a same base station is known as a softer handoff.

A hard handoff occurs when a mobile station moves from one base station to a base station belonging to a different mobile switching center (MSC) wherein the base stations have traffic channels of different FA or traffic channel of different frame offsets. In the hard handoff, a communication with a new base station ends before communication with a base station currently in service starts.

Such handoffs as described above occurs frequently in a CDMA mobile communication system having a multiple frequency environment. FIG. 1 is a flow chart showing messages between a mobile station and a base station during a handoff based on a mobile assist handoff (MAHO) method of the CDMA mobile communication system in the related art. The MAHO method is initiated by a request of a handoff from a mobile station. In the MAHO method, a soft, a softer or a hard handoff is executed according to factors such as a resource relation between a base station servicing a current call and an adjacent base station, and a systematic construction of the adjacent base station. The operation of the MAHO method in a CDMA mobile communication system during a handoff is as follows.

Referring to FIG. 1, mobile station first checks the strength of the same frequency pilot signal from an adjacent base station or cell, and transmits a pilot strength measurement message (PSMM) to a base station through a traffic channel servicing the current call (S100). The base station and a base station controller analyze the transmitted PSMM and the information of the adjacent base station which the base station already possesses, to decide whether an ADD handoff procedure for establishing a new traffic path or a DROP handoff procedure for withdrawing one of an established traffic paths should be executed. Thus, an extended handoff direction message (EHDM) is transmitted to the mobile station (S101).

A pilot PN included in the transmitted EHDM is registered in an active set of the mobile station, and according to the registration, the mobile station executes for example an establishment/withdrawal of a new traffic path or an establishment/withdrawal of a simultaneous traffic path. After the execution, the mobile station transmits a handoff complete message (HCM) to the base station (S102). In the above-described MAHO method, the mobile station can transmit the PSMM only when the frequency of a current traffic call and the frequency used in a destination adjacent base station are common, FIG. 2 is a block diagram showing a CDMA mobile communication system having an environment of a multiple frequency. Referring to FIG. 2, the CDMA mobile communication system includes a mobile station MS 207, base stations 204~206 for taking charge of a radio interface with the mobile station 207, control stations BSC 202 and 203 for controlling the base stations 204~206 and for processing a vocoding of a voice packet, a mobile switching center MSC 200 for translating a subscriber's number to switch a call, and a home location register HLR 201 for storing and processing positional information of subscribers required for a paging.

A CDMA mobile communication system of the multiple frequency environment occurs in a mass subscribed area and non-mass subscribed neighboring area as the number of the subscribers increases. For example, suppose that a cell A under the charge of the first base station 204 is a massed-subscribed area and cells B and C respectively under the charge of the second and third base stations 205, 206 are non-massed-subscribed areas. The mobile station 207 positioned at the neighboring area of the first and second base stations 204, 205 would have the multiple frequency environment.

In the multiple frequency environment, if the number of frequencies used in the first base station 204 and the number of frequencies used in the second and third base stations 205, 206 are different, a mobile station having a call established using a non-common frequency may move from the first base station 204 to the second base station 205. In such case, an intra-frequency handoff should be performed.

However, the intra-frequency handoff cannot be performed in the MAHO method as described above, because the mobile station cannot transmit the PSMM when the frequency is different from the frequency of an adjacent base station. To solve this problem, a pilot generating equipment capable of generating a pilot may be additionally implemented in every base station positioned within the multiple frequency environment. Particularly, a pilot generating equipment is capable of transmitting a pilot in all frequencies used in a multiple frequency environment including the frequencies used by the first base station, i.e. the boundary base station, and the non-common frequencies Thus, the pilot generating equipment would generate the PSMM when a mobile station moves to the second base station, i.e. the destination base station.

As a result, the base stations 204~206 and the base station controllers 202, 203 analyze the generated PSMM to execute the intra-frequency handoff procedure when the PSMM is generated through the pilot generating equipment. The intra-frequency handoff method based on a conventional technique is as follows.

The pilot generating equipment for transmitting a pilot of frequency during conversation is already installed in the destination base station or the second base station 205. Thus, when the mobile station moves from the first base station 204 to the second base station 205, the pilot generating equipment of the second base station 205 generates pilot for a corresponding frequency. Based upon the generated pilot, the mobile station can measure a pilot signal strength of the second base station 205. Accordingly, when the pilot signal strength is larger than a comparison value from the first base station 204 and the base station controller 202, the PSMM is transmitted to the first base station 204 as a decision message to execute a handoff process.

Subsequently, the first base station 204 analyzes the PSMM and recognizes the intra-frequency handoff. If the signal strength of the second base station 205 meets the condition to perform the intra-frequency handoff, the first base station 204 establishes a new traffic path between a corresponding mobile station and the second base station 205 by using the EHDM and the HCM. Simultaneously, the first base station 204 withdraws its own traffic path.

However, the intra-frequency handoff method as described above has problems when numerous boundary base stations exist in a neighboring area of the multiple frequency environment. First, the systematic operation becomes complicated when additional pilot generating equipments are utilized to generate the pilot of a frequency during conversation. The installation of the pilot generating equipment in every the boundary base station within the multiple frequency environment not only complicates the maintenance, but increases the cost of the system.

Also, the CDMA mobile communication system may be implemented with a plurality of micro base stations (micro BTS) to manage a capacity problem of a specific area As a result, the conventional intra-frequency handoff control method would require individual installments of separate hardware apparatuses such as a pilot beacon in the micro base stations, Accordingly, additional pilot generating equipment would be difficult to apply in a handoff performed with the micro BTS. Moreover, a frequency transmitter of the pilot generating equipment installed for the intra-frequency handoff must be increased whenever the number of frequencies in the system is increases, thereby further complicating the system.

SUMMARY OF THE INVENTION

Accordingly, an object of the present invention is to solve at least the problems and disadvantages of the related art.

An object of the present invention is to provide an efficient and simple intra-frequency handoff method.

Another object of the present invention is to provide an intra-frequency handoff method without a use of a pilot generating equipment in a CDMA mobile communication system having a multiple frequency environment.

Additional advantages, objects, and features of the invention will be set forth in part in the description which follows and in part will become apparent to those having ordinary skill, in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an intra-frequency handoff method in a mobile communication system with a first base station providing a service for a mobile station and a second base station adjacent to the first base station, comprises (1) detecting by the first base station a handoff occurrence of a mobile station having a call established using a common frequency with the second base station accumulating strength of signals used in the detected handoff and extracting handoff career data; (2) comparing a threshold value determined from the extracted handoff career data and a signal strength value received from a mobile station having a call established using a non-common frequency with the second base station to decide a point of time for the handoff; and (3) executing a handoff for the mobile station using the non-common frequency according to the decided handoff point of time.

Preferably, the first step of the intra-frequency handoff method includes recognizing through a program load data loaded during a systematic initialization that the first base station is itself a boundary base station positioned in the multiple frequency environment; initializing the handoff career data predetermined in the first base station; detecting in the first base station whether or not a mobile station handoff to the second base station, among mobile stations having a call established using a common frequency between the first and second base stations, occurs; discriminating a type of the detected handoff when a mobile station handoff to the second base station is detected; analyzing a PSMM used in executing the detected handoff according to the discriminated type; and accumulating the signal strength extracted according to the analyzed result of the initialized handoff career data.

Also, the second step in the intra-frequency handoff method includes selecting a call anticipated for an occurrence of an intra-frequency handoff; requiring the mobile station having the selected call to transmit the PSMM; determining a given threshold value $Thresh_{pilot}$ on the standard of the extracted handoff career data when the PSMM is received by the above requirement; comparing the given threshold value $Thresh_{pilot}$ with a magnitude of the received PSMM; and deciding a point of time for the handoff of the selected call according to the comparison result.

Furthermore, the handoff in third step of the intra-frequency handoff method includes pre-performing handoff so that a mobile station using the non-common frequency uses a common frequency with the second base station; and executing the handoff to the second base station according to a soft handoff procedure between the first and second base stations.

BRIEF DESCRIPTION OF THE ATTACHED DRAWINGS

The invention will be described in detail with reference to the following drawings in which like reference numerals refer to like elements wherein:

FIG. 4 is a flow chart showing a handoff control procedure in an intra-frequency handoff method in accordance with the present invention.

DETAILED DESCRIPTION OF PREFERRED EMBODIMENT

Reference will now be made in detail to the preferred embodiments of the present invention, examples of which are illustrated in the accompanying drawings.

Generally, the inventive intra-frequency handoff method provides an efficient performance of a frequency handoff method in a CDMA mobile communication system having a multiple frequency environment. The present intra-frequency handoff method can be implemented by a simple change of software without adding a pilot generating equipment in every boundary base stations of the multiple frequency environment, thereby significantly reducing the cost of the system.

Also, the intra-frequency handoff method of the present invention satisfies the IS-95 standard of Telecommunication industry Association (EIA/TIA) to ensure compatibility with all mobile stations. Particularly, the handoff control procedure is based on the CDMA standard procedure described above with reference to FIG. 2. Moreover, the intra-frequency handoff method of the present invention is applicable to all digital cellular system (DCS) using a mobile communication technique of the CDMA, a personal communication system (PCS), a wireless local loop system (WLL) and the mobile communication system IMT-2000 of the next generation using a wideband-CDMA.

Figure 1:
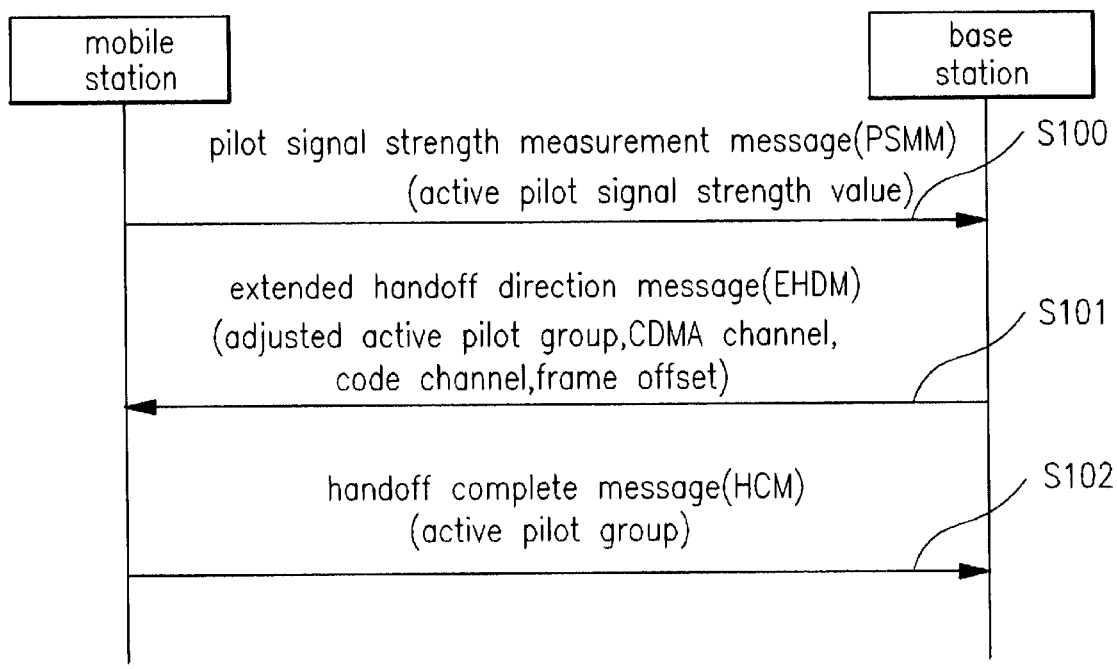
FIG. 1 is a flow chart showing a message between a mobile station and a base station during a handoff based on a MAHO method in a conventional CDMA mobile communication system.
Figure 2:
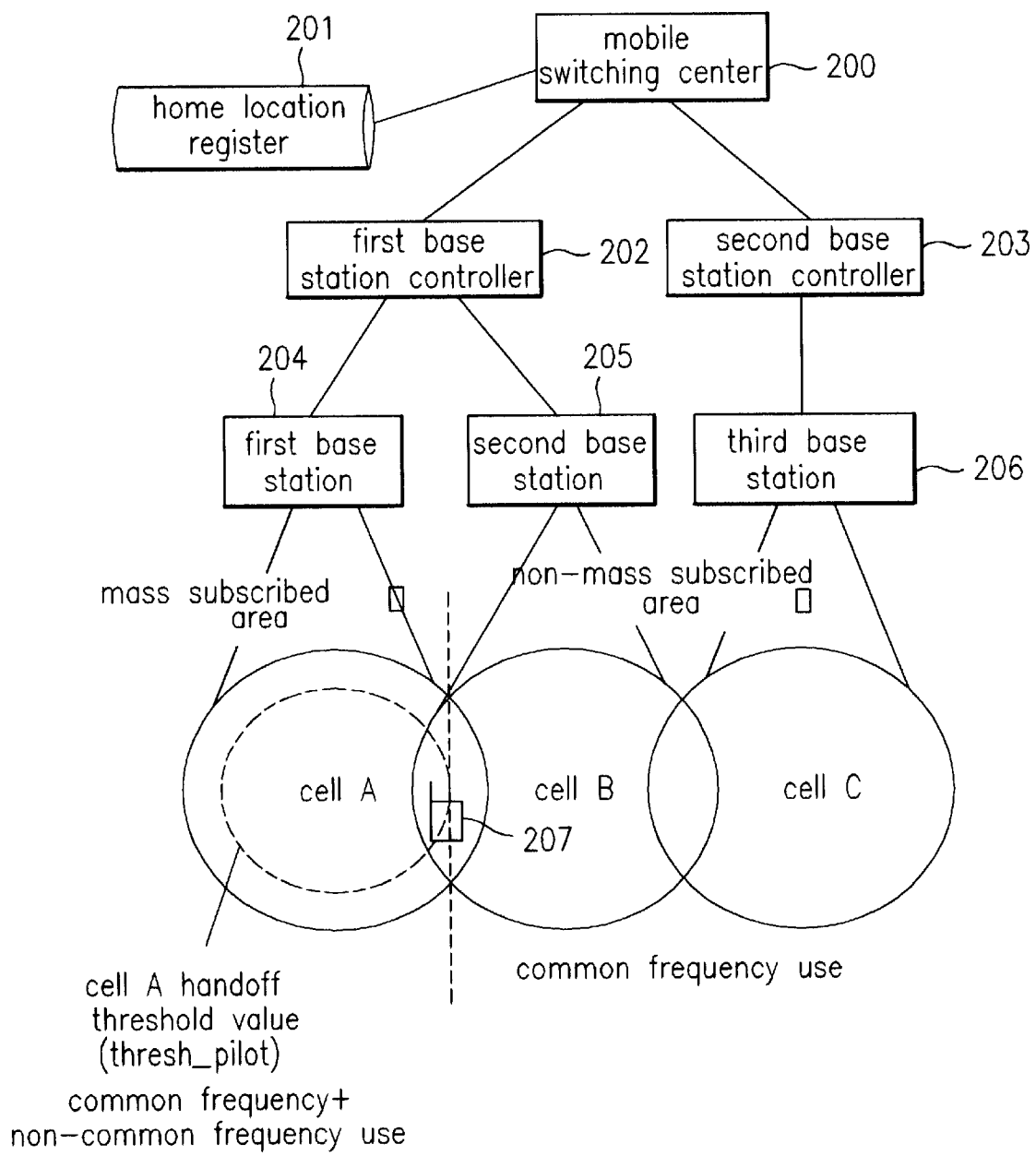
FIG. 2 is a block diagram showing a CDMA mobile communication system having a multiple frequency environment.

As also shown in FIG. 2, a CDMA mobile communication system for implementing the intra-frequency handoff method of the present invention includes a mobile station MS 207 positioned in a multiple frequency environment, a base station BTS 204 for taking charge of a radio interface with the mobile station 207, a base station controller BSC 202 for controlling the base station 204 and for processing the vocoding of a voice packet, a mobile switching center MSC 200 for translating a subscriber's number and switching a call, and a home location register HLR 201 for storing and processing positional information of subscribers required for a paging.

Referring to FIG. 2, the first base station BTS 204 is a boundary base station in charge of cell A which is a mass subscribed area while the second and third base stations BTS 205 and 206 are respectively in charge of cells B and C which are non-mass subscribed areas. Also, the first BTC 202 controls the first BTS 204 and the second base station BTS 205, and a second BSC 203 controls the third base station BTS 206. The present intra-frequency handoff method in the CDMA mobile communication system of the multiple frequency environment is executed by combining an extraction procedure of the handoff career data as shown in FIG. 3 with a handoff control procedure as shown in FIG. 4 to efficiently control an intra-frequency handoff.

Generally, in the extraction procedure, real time data used during an ADD handoff procedure and a DROP handoff procedure among the procedures of soft handoffs executed for boundary base stations are respectively accumulated in consideration of boundary base stations positioned in the multiple frequency environment. Thus, the handoff career data for determining the point in time to execute a soft handoff is extracted.

In the handoff control procedure, the boundary base station selects a call anticipated for an intra-frequency handoff occurrence, monitors the selected call and simultaneously decides a point in time of the intra-frequency handoff for the selected call by using the handoff career data extracted by the extraction procedure. Thereafter, using the determined point in time of the intra-frequency handoff, a handoff is executed for a corresponding call, The extraction and handoff control procedures consecutively operate by real time in the boundary base station of the multiple frequency environment.

Figure 3:
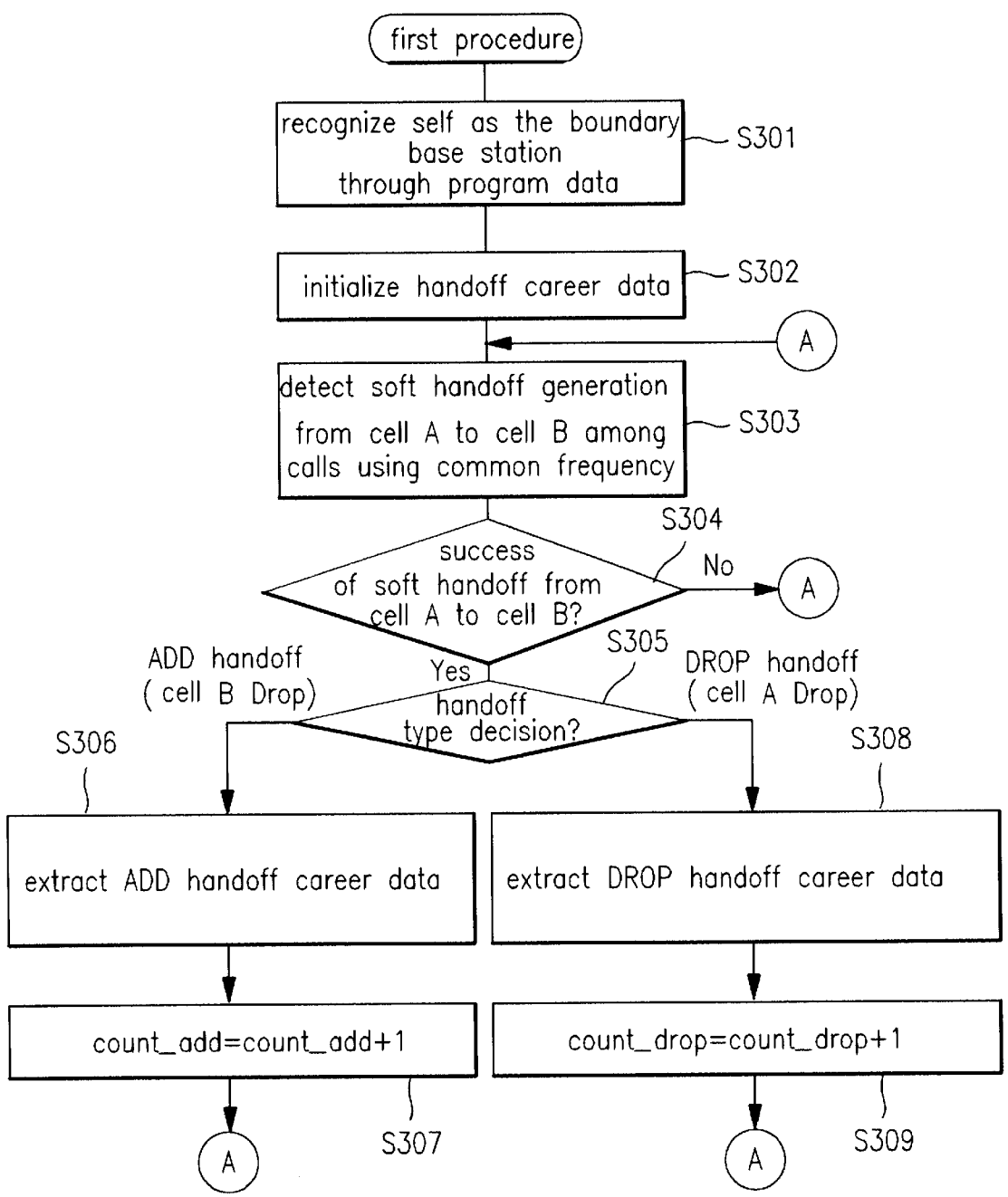
FIG. 3 is a flow chart showing an extraction procedure of a handoff career data in an intra-frequency handoff method in accordance with the present invention.

Referring to FIGS. 2 and 3, in the extraction procedure of the handoff career data, the first base station 204 accumulates the real time data used in processing soft handoffs for calls established using a common frequency, extracts the handoff career data to be used in the intra-frequency handoff, and determines a threshold value $Thresh_{pilot}$ required for deciding a initiation point in time of the intra-frequency handoff. Hereinafter, a "common FA" indicates a frequency common to an origination base station or cell and a destination base station or cell.

Particularly, the first base station 204 respectively accumulates the real time data which is used for the ADD handoff procedure for establishing a new call and the DROP handoff procedure for withdrawing an established call in processing the soft handoff of calls to adjacent base stations using a common frequency.

Namely, the first base station 204 first reads program load data (PLD) and recognizes that the first base station 204 itself is the boundary base station (S301). The PLD is loaded when a system of the base station is initialized, and is transmitted to the mobile station through a paging channel. Specifically, the PLD transmitted to the mobile station contains handoff parameters such as T_ADD, T_DROP, T_COMP and T_DROP. By using the handoff parameters, the mobile station executes the ADD handoff procedure to establish a new traffic link, the DROP handoff procedure to withdraw an existing traffic link and a SWAP handoff procedure in which the ADD and DROP handoff procedures are processed at the same time.

Upon recognizing that the first base station 204 is itself a boundary base station, an initialization of the handoff career data to be extracted is performed (9302) as follows, where $Mean_{add}$ represents a mean value existing in the ADD handoff procedure to the second base station 205 gained by accumulating current signal strength of the first base station 204, $Mean_{drop}$ indicates a mean value existing in the DROP handoff procedure of the first base station 204 obtained by accumulating current signal strength of the first base station 204, $count_{add}$ indicates the number of the ADD handoff procedures and $count_{drop}$ indicates the number of DROP handoff procedures.

$$Mean_{add} = T\_ADD$$

$$Mean_{drop} = T\_DROP$$

$$count_{add} = '0'$$

$$count_{drop} = '0'.$$

The "$Mean_{add}$" and "$Mean_{drop}$" are used in the determination of the threshold value $Thresh_{pilot}$ required for deciding an occurrence time point of the intra-frequency handoff.

When the handoff career data is initialized according to step S302, the first base station 204 detects soft handoff of calls to the second base station 205 among calls established using a common frequency (S303). If such a call is detected, a determination is made whether the soft handoff of the corresponding call is successful (S304). If neither an ADD handoff procedure nor a DROP procedure is successful, the first base station 204 ignores the failed handoff and continues to monitor whether a handoff from cell A to cell B is generated (S303). However, when a soft handoff from a cell A to a cell B is successful, the first base station 204 determines whether an ADD handoff procedure or a DROP handoff procedure for the call was successful (S305).

If the successful handoff type is an ADD handoff procedure from cell A to cell B, the first base station 204 analyzes the PSMM used during the ADD handoff procedure, and reflects its own signal strength generated at the corresponding time point of the ADD handoff procedure in the mean value "Mean$_{add}$" already extracted (S306) The mean value "Mean$_{add}$" may be calculated by Equation 1 below.

$$Mean_{add} = \frac{Mean_{add} \times count_{add} + cur_{serving\ \pi\ lot}}{(count_{add} + 1)} \quad [1]$$

On the other hand, if the successful handoff type is a DROP handoff procedure, the first base station 204 analyzes the PSMM used in the DROP handoff procedure, and reflects the signal strength of the pilot signal generated at the corresponding time point of the DROP handoff in the mean value "Mean$_{drop}$" already extracted (S308) The mean value "Mean$_{drop}$" may be calculated by equation 2 below.

$$Mean_{drop} = \frac{Mean_{drop} \times count_{drop} + cur_{serving\ \pi\ lot}}{(count_{drop} + 1)} \quad [2]$$

The greater the signal strength of either the ADD handoff or the DROP handoff respectively calculated through Equations [1] and [2] accumulates, the more exact the threshold value Thresh$_{pilot}$ used for determining the time point for the intra-frequency handoff becomes. Accordingly, the number of the ADD handoff procedures count$_{add}$ or the number of the DROP handoff procedures count$_{drop}$ is accumulated together in steps S307 and S309, such that a weighted value can be applied.

Thus, the accumulated signal strength values of the ADD handoff and the DROP handoff function as the handoff career data which is used for the intra-frequency handoff by the first base station 204 positioned in the multiple frequency environment. FIG. 4 is a flow chart showing a handoff control procedure in the present intra-frequency handoff method.

Referring to FIG. 4, a call anticipated for an intra-frequency handoff occurrence is monitored, and a threshold value Thresh$_{pilot}$ is determined using the Mean$_{add}$ and Mean$_{drop}$ as the handoff career data extracted by the first base station 204. According to the threshold value Thresh$_{pilot}$, a time point of the intra-frequency handoff for the anticipated call requiring the intra-frequency handoff is decided Thereafter, the intra-frequency handoff of the corresponding call is executed at the decided time point.

A call requiring the intra-frequency handoff between the first and second base stations 204, 205 may arise in different situations. For example, an intra-frequency handoff may occur when a call S established using a non-common frequency moves from the first base station 204 to the second base station 205, or a call established using a non-common frequency moves from a base station positioned in a mass subscribed area to the first base station 204. In the latter case, a call H established with a frequency existing in the first base station 204 but not existing in the second base station 205 may be soft handoff from a fourth base station (not shown in the drawings) to the first base station 204.

Thus, the handoff control procedure begins at a time point when a 'Call S' is established or when a 'Call H' is added to the first base station 204 (S401 and S402).

When a call to be monitored is selected in steps S401 and S402, the first base station 204 sets a pilot strength measurement message requiring timer T_psmmreq and request a transmission of the PSMM to measure a pilot signal strength of cell A from the mobile station (5403) At this time, the first base station 204 enters a stand-by mode (S404) to receive the PSMM. If the PSMM is not received from the mobile station within the time period of T_psmmreq, the first base station 204 may again request the mobile station to transmit the PSMM by using a traffic channel. Also, the first base station 204 again sets the T_psmmreq to require a transmission of the consecutive PSMM and enters the stand-by mode. The process (S405~S408) is repeated.

Subsequently, when the PSMM for the pilot signal strength measurement of the first base station 204 is received from the mobile station (S409), the first base station 204 determines the threshold value Thresh$_{pilot}$ (S410) for deciding the time point for executing the intra-frequency handoff by using the extracted handoff career data, i.e. the signal strength mean values Mean$_{add}$ and Mean$_{drop}$ of cell A. Thus, the threshold value Thresh$_{pilot}$ is determined from the Mean$_{add}$ and Mean$_{drop}$. Namely, the threshold value Thresh$_{pilot}$ is some value between the Mean$_{add}$ and Mean$_{drop}$. In the present invention, the threshold value Thresh$_{pilot}$ may be determined by Equation [3].

$$Thresh_{n\ lot} = \frac{Mean_{add} + mean_{drop}}{2} \quad [3]$$

Once the threshold value Thresh$_{pilot}$ is determined, the first base station 204 compares the magnitudes of the pilot signal strength of cell A measured from the PSMMs and the threshold value Thresh$_{\_pilot}$ (S411) If the pilot signal strength of cell A is smaller than the threshold value Thresh$_{pilot}$, the first base station 204 and the first base station controller 202 initiate the intra-frequency handoff for the corresponding call. On the other hand, if the pilot signal strength of the cell A is larger than the threshold value, the first base station 204 and the first base station controller 202 ignore the received PSMM and enter a stand-by mode (S412). When the intra-frequency handoff starts, the T_psmmreq is withdrawn (S413).

Thus, the intra-frequency handoff for a call is executed by the first base station 204 and the first base station controller 202 at a decided time point.

At this time, the intra-frequency handoff is initially executed within the area of the first base station 204 (S414) Namely, the intra-frequency handoff for a corresponding call is executed from a non-common frequency of cell A to one of an available common frequency of the base station 205. Such a handoff prevents the call from being cut off if an error such as in the decided time point of the intra-frequency handoff to the second base station 205 has an error. Therefore, even when the intra-frequency handoff to the second base station 205 fails, the corresponding call is handoff to a common frequency in the first base station 204, thereby maintaining a constant traffic quality. Thereafter, the first base station 204 and the first base station controller 202 execute the handoff for the corresponding call to the second base station 205 using a common frequency, by a conventional soft handoff procedure.

More particularly, the mobile station which is first handoff to an available common frequency within the first base station 204 transmits a PSMM to the first base station 204. The first base station controller 202 which controls the first base station 204 then decides the type of a handoff based upon the pilot strength of the first base station 204 contained in the transmitted PSMM, a base station pilot PN and the information of the second base station 205 which the first base station controller 202 already possess.

Subsequently, the first base station 204 transmits the EHDM to a corresponding mobile station to inform the determined type of handoff. When the EHDM is received, the corresponding mobile station registers a pilot PN contained in the EHDM to its own active set, and transmits the HCM to the first base station 204

Such a soft handoff is executed by a base station management (BSM), a base station processor (BSP), a selector vocoder control subsystem (SVCS) and a call control processor (CCP). The BSM operates and manages the handoff parameters, the BSP allots new radio channels, the SVCS analyzes a paging channel element for transmitting an actual paging to the mobile station and a signaling from the traffic channel and the mobile station, and the CCP decides the type of handoff.

Meanwhile, if the corresponding call is released during the execution of the handoff procedure (S417), i.e. the call ends, the T_psmmreq is withdrawn (S418), and all procedures for the corresponding call are completed. Thus, the first base station 204 continues to monitor other calls.

The present intra-frequency handoff method described above can be applied to all base stations 204~206, shown in FIG. 2. Generally, all procedures are processed in the base station and the base station controller, and a protocol between the mobile station and the base station is the protocol IS-95 of EIA/TIA based on the current CDMA standard. In other words, a change in the mobile station is not necessary. Also, for purposes of explanation, the present invention was described with only an environment between cells of two base stations without mention of a specific sector.

As described above, the intra-frequency handoff method according to the present invention has the following effects. First, an intra-frequency handoff can be executed in all communication systems operated by a CDMA system through a change in software, without installing a pilot generating equipment in a boundary base station, to perform the handoff procedure in base stations adjacent to a multiple frequency environment. Accordingly there is a significant reduction in both the systematic foundation and operation expenses.

Furthermore, the present intra-frequency handoff method is usable in the base station and a base station controller, and satisfies the IS-95 of EIA/TIA as the CDMA standard in order to ensure a compatibility with the existing mobile stations in use. Thus, a compatibility is maintained with all kinds of mobile terminals. Finally, the present intra-frequency handoff method uses a real time handoff career data of the base station itself to reflect different characteristics of a radio environment for each boundary base station of the multiple frequency environment, thereby being able to calculate an exact intra-frequency hard handoff time point to improve a success rate of the handoff The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An inter-frequency handoff method in a mobile communication system, with a first base station providing service to mobile stations and a second base station adjacent to the first base station, said method comprising:

(a) detecting, at the first base station, mobile station handoffs to the second base station, wherein each mobile station has a call established using a common frequency, and extracting handoff career data by accumulating strength of signals used in the detected mobile station handoffs;

(b) determining a threshold value based upon the extracted handoff career data, comparing the threshold value with a signal strength value received from a mobile station MS having a call established using a frequency not in common with the second base station, and deciding a time point of a handoff based upon a result of the comparison; and (c) executing the handoff of the mobile station MS using said non-common frequency according to the decided time point of the handoff.

2. A method of claim 1, wherein (a) comprises:

recognizing through a program load data that the first base station is itself a boundary base station positioned in a multiple frequency environment;

initializing the handoff career data in the first base station;

detecting at the first base station soft handoffs to the second base station among calls using a common frequency;

determining a soft handoff type if a soft handoff to the second base station among calls using a common frequency is detected;

analyzing a pilot signal strength measurement message used in executing the detected soft handoffs based upon the soft handoff type; and accumulating signal strengths obtained using the analyzed result.

3. A method of claim 2, wherein the soft handoff type can be one of either an ADD handoff procedure and a DROP handoff procedure.

4. A method of claim 3, wherein the signal strength generated in the first base station at a time point corresponding to an ADD handoff procedure is accumulated as a first mean value if the soft handoff type is determined to be an ADD handoff procedure, and the signal strength generated in the first base station at a time point corresponding to a DROP handoff procedure is accumulated as a second mean value if the soft handoff type is determined to be a DROP handoff procedure, and wherein the threshold value is determined based upon the first and second mean values.

5. A method of claim 4, wherein the threshold value is determined as some value between the first mean value and the second mean value.

6. A method of claim 1, wherein (b) comprises:

selecting a call anticipated for an occurrence of the intra-frequency handoff, wherein the mobile station MS is a mobile station having the selected call;

requesting the mobile station MS to transmit the PSMM;

determining the threshold value based upon the handoff career data when the PSMM is received;

comparing the threshold value with a magnitude of the received PSMM; and deciding the time point of the handoff for the selected call according to the comparison result.

7. A method of claim 6, wherein a call selected can be one of either a call established with a non-common frequency moving from the first base station to the second base station, or a call established with a non-common frequency moving from a third base station positioned in a mass subscribed area to the first base station.

8. A method of claim 6, wherein the requesting of the PSMM comprises:

setting a timer;

requesting a transmission of the PSMM within a given period of the timer; and re-setting the timer if the PSMM is not received within the given period of the timer, and re-requiring the transmission of the PSMM through a traffic channel.

9. A method of claim 6, wherein a point in time when the received PSMM becomes smaller than the threshold value is decided as the handoff time point of the handoff.

10. A method of claim 1, wherein (c) comprises:

executing a handoff of the mobile station MS from a non-common frequency of the first base station to one of an available frequency common to the first and second base stations; and executing the handoff of the mobile station MS from the first base station to the second base station using the common frequency according to the soft handoff procedure between the first and second base stations.

11. An inter-frequency handoff method in a mobile communication system with a first call and a second call having a frequency different from the first call, comprising:

(a) detecting a handoff occurrence of a call using a common frequency between the first cell and the second cell;

(b) determining a type of a detected handoff and accumulating strengths of signals used by the first cell in executing the detected handoff;

(c) selecting a call established using a non-common frequency of the first and second cells;

(d) requesting a pilot strength measurement message from the selected call;

(e) determining a threshold value utilizing the accumulated strength of signals, comparing the determined threshold value with a magnitude of the received pilot signal strength measurement message, and deciding a time point of the handoff for the selected call; and (f) executing the handoff of the selected call from the first cell to the second cell according to the decided handoff time point.

12. A method of claim 11, wherein in (b), accumulating a first mean value by analyzing the PSMM used in an ADD handoff procedure, and accumulating a second mean value by analyzing the PSMM used in a DROP handoff procedure, wherein the first and second mean values are utilized to determine the threshold value in (e).

13. A method of claim 11, wherein the threshold value is determined as some value between the first mean value and the second mean value.

14. A method of claim 11, wherein (d) further comprises setting a timer when requesting the PSMM and re-requesting the PSMM for the selected call through a traffic channel if the requested PSMM is not received during the time period of the timer.

15. A method of claim 11, wherein in (e), a point in time when the received PSMM becomes smaller than the determined given threshold value, is decided as a handoff time point for the selected call.

16. A method of claim 11, wherein (f) further comprises:

performing a handoff of the selected call from a non-common frequency to a common frequency of the first and second cells; and executing the handoff of the selected call from the first cell to the second cell according to a soft handoff procedure.

17. A method of claim 11, further comprising completing all procedures for the corresponding call when the selected call is released and monitoring other calls.

* * * * *